US008032162B2

(12) United States Patent
Kim et al.

(10) Patent No.: US 8,032,162 B2
(45) Date of Patent: Oct. 4, 2011

(54) APPARATUS AND METHOD FOR TRANSMISSION OF MESSAGES TO MULTIPLE RECIPIENTS

(75) Inventors: Do Hyung Kim, Busan (KR); Jae Wan Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 11/776,189

(22) Filed: Jul. 11, 2007

(65) Prior Publication Data

US 2008/0076455 A1    Mar. 27, 2008

(30) Foreign Application Priority Data

Sep. 26, 2006  (KR) .................. 10-2006-0093645

(51) Int. Cl.
    *H04W 4/00*   (2009.01)
(52) U.S. Cl. ........................ 455/466; 455/566
(58) Field of Classification Search .................. 455/466, 455/414.1, 414.2, 414.4, 518, 519, 566
    See application file for complete search history.

(56) References Cited

U.S. PATENT DOCUMENTS

| | | | | |
|---|---|---|---|---|
| 6,496,853 B1 * | 12/2002 | Klein | ......................... | 709/206 |
| 6,608,637 B1 * | 8/2003 | Beaton et al. | ................. | 715/762 |
| 7,437,413 B2 * | 10/2008 | Okuyama et al. | ............. | 709/206 |
| 7,466,987 B2 * | 12/2008 | Kinnunen et al. | ......... | 455/456.3 |
| 7,574,478 B2 * | 8/2009 | Mittelstaedt et al. | ......... | 709/206 |
| 2005/0089006 A1 * | 4/2005 | Wang et al. | .................... | 370/349 |
| 2007/0283044 A1 * | 12/2007 | Van Belle et al. | ............. | 709/245 |
| 2008/0039124 A1 * | 2/2008 | Linder et al. | .................. | 455/466 |

FOREIGN PATENT DOCUMENTS

KR    1020050079388    8/2005

* cited by examiner

*Primary Examiner* — Charles Appiah
*Assistant Examiner* — Stamford Hwang
(74) *Attorney, Agent, or Firm* — H.C. Park & Associates, PLC

(57) ABSTRACT

A method for transmitting a message containing both common content to be transmitted to a plurality of receiving mobile communication terminals and specific content to be transmitted to a specific receiving mobile communication terminal includes displaying, when in a message writing mode, a message writing window including a first writing area and a second writing area, writing messages in the first writing area and the second writing area, inputting a telephone number of the receiving mobile communication terminal to which the message written in the second writing area is to be transmitted, combining the messages written in the first writing area and in the second writing area, and transmitting the messages to the receiving mobile communication terminal.

6 Claims, 5 Drawing Sheets

FIG. 4D

| COMMON CONTENT WRITING AREA |
| SPECIFIC CONTENT WRITING AREA |
| [1] FIRST SUB-WRITING AREA |
| [2] SECOND SUB-WRITING AREA |
| [3] THIRD SUB-WRITING AREA |

FIG. 4E

NOTICE OF SCHEDULE
LOCATION: MEETING ROOM
TIME: 14:00 2006.07.25
SPECIFIC CONTENT WRITING AREA
[1] FIRST SUB-WRITING AREA
[2] SECOND SUB-WRITING AREA
[3] THIRD SUB-WRITING AREA

FIG. 4F

NOTICE OF SCHEDULE
LOCATION: MEETING ROOM
TIME: 14:00 2006.07.25
SPECIFIC CONTENT WRITING AREA
[1] PREPARE PRESENTATION MATERIALS
[2] BE PROMPT!
[3] FEEL FREE TO JOIN

FIG. 4G

RECEIVER TELEPHONE NUMBER INPUT
[1] FIRST RECEIVING MOBILE COMMUNICATION TERMINAL
[2] SECOND RECEIVING MOBILE COMMUNICATION TERMINAL
[3] THIRD RECEIVING MOBILE COMMUNICATION TERMINAL

APPARATUS AND METHOD FOR TRANSMISSION OF MESSAGES TO MULTIPLE RECIPIENTS

CROSS REFERENCE TO RELATED APPLICATION

This application claims priority from and the benefit of Korean Patent Application No. 10-2006-0093645, filed on Sep. 26, 2006, which is hereby incorporated by reference for all purposes as if fully set forth herein.

BACKGROUND OF THE INVENTION

1. Field of the Invention

The present invention relates to an apparatus and a method for transmitting a message to a plurality of receiving mobile communication terminals, and more particularly, to an apparatus and a method for transmitting a message containing both common content to be transmitted to all of the plurality of receiving mobile communication terminals and specific content to be transmitted to a specific receiving mobile communication terminal.

2. Discussion of the Background

Short message service (SMS) and multimedia message service (MMS) are well-known data communication services provided for mobile communication terminals, and many mobile communication terminal users exchange information using these message services.

In conventional message transmission methods, a message prepared at a transmitting mobile communication terminal is sent to a receiving mobile communication terminal. With developments in the technology of wireless communication and mobile communication terminals, it has become possible to transmit a message from a mobile communication terminal to a plurality of receiving mobile communication terminals, wherein each receiving mobile communication terminal receives an identical message having the same content.

When transmitting a message to a plurality of mobile communication terminals, the message may require slightly different content for each receiving mobile communication terminal. In conventional methods, a message is prepared at the transmitting mobile communication terminal, which transmits the message to a first receiving mobile communication terminal and then stores the message. Subsequently, the transmitting mobile communication terminal retrieves the stored message, amends the content of the message, and then transmits the amended message to a second receiving mobile communication terminal. The transmitting mobile communication terminal may individually transmit messages containing slightly different content to a plurality of receiving mobile communication terminals by repeating the above steps.

However, in the above method, the message transmitted to the first mobile communication terminal must be stored and retrieved to amend the message for transmission to the second mobile communication terminal.

SUMMARY OF THE INVENTION

The present invention provides a method of transmitting a message to a plurality of receiving mobile communication terminals with minimal key strokes.

The present invention also provides a method of transmitting a message containing both common content, which is to be transmitted to all receiving mobile communication terminals, and specific content, which is to be transmitted to a specific receiving mobile communication terminal.

Additional features of the invention will be set forth in the description which follows, and in part will be apparent from the description, or may be learned by practice of the invention.

The present invention discloses a method of transmitting a message from a transmitting mobile communication terminal to a receiving mobile communication terminal including displaying, when in a message writing mode, a message writing window including a first writing area and a second writing area, writing messages in the first writing area and the second writing area, inputting an identification code of the receiving mobile communication terminal where the message written in the second writing area is transmitted, combining the messages written in the first writing area and the second writing area into a combined message, and transmitting the combined message to the receiving mobile communication terminal.

The present invention also discloses an apparatus for transmitting a message including a display unit, an input device, and a control unit. The display unit displays, when in a message writing mode, a message writing window including a first writing area and a second writing area. The input device enters messages in the first writing area and the second writing area and inputs an identification code of the receiving mobile communication terminal where the message in the second writing area is to be transmitted. The control unit combines the messages written in the first writing area and in the second writing area and to control transmission of the messages to the receiving mobile communication terminal.

The present invention also discloses a method for transmitting a message from a transmitting mobile communication terminal to a receiving mobile communication terminal including displaying, when in a message entering mode, a message writing window including a first message area and a second message area, entering messages in the first message area and in a plurality of sub-message areas of the second message area, inputting an identification code of the receiving mobile communication terminal in an identification code input area corresponding to a sub-message area where a message to be transmitted to the receiving mobile communication terminal is written, and transmitting messages written in the sub-message areas of the second message area to the receiving mobile communication terminal.

It is to be understood that both the foregoing and general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4A, FIG. 4B, FIG. 4C, FIG. 4D, FIG. 4E, FIG. 4F, and FIG. 4G show screen display examples of data displayed on the display unit of a transmitting mobile communication terminal according to an exemplary embodiment of the present invention.

DETAILED DESCRIPTION OF THE ILLUSTRATED EMBODIMENTS

Figure 1:
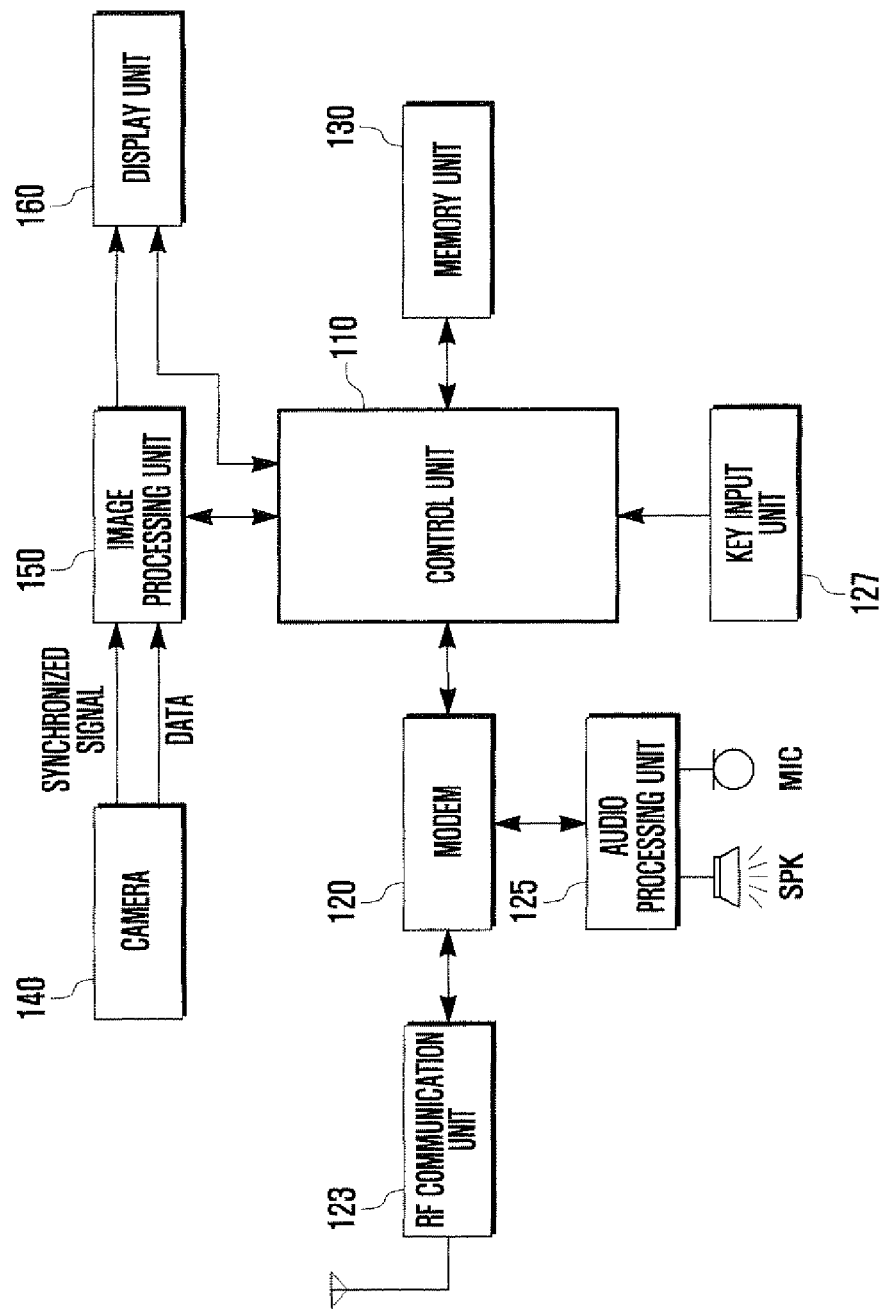
FIG. 1 is a schematic block diagram showing a configuration of a mobile communication terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will convey the scope of the invention to those skilled in the art. Like reference numerals in the drawings denote like elements.

FIG. 1 is a schematic block diagram showing a configuration of a mobile communication terminal according to an exemplary embodiment of the present invention.

Referring to FIG. 1, the mobile communication terminal includes a radio frequency (RF) communication unit 123, a modem 120, a camera 140, an image processing unit 150, a display unit 160, a control unit 110, an audio processing unit 125, a key input unit 127, and a memory unit 130. The mobile communication terminal may further include other devices.

The RF communication unit 123 performs wireless communication of the mobile communication terminal. The RF communication unit 123 includes an RF transmitter for up-converting the frequency of a transmitting signal and amplifying the signal, and an RF receiver for low-noise amplifying the frequency of a received signal and down-converting its frequency. The modem 120 includes a transmitter to encode and modulate the transmitting signal, and a receiver to decode and demodulate the received signal. The audio processing unit 125 is configured with a codec, including a data codec to process packet data and an audio codec to process audio signals such as a voice signal. The audio processing unit 125 converts a digital audio signal received from the modem 120 into an analog signal through the audio codec and outputs the analog signal through a speaker SPK. The audio processing unit 125 converts an analog signal input through a microphone MIC into a digital audio signal through the audio codec and transmits the digital audio signal to the modem 120. The codec may be installed separately or may be included in the control unit 110.

The memory unit 130 may be configured with a program memory unit and a data memory unit. The program memory unit stores programs required for the general operation of the mobile communication terminal. The data memory unit stores phonebook, schedule, memo, image, and audio data.

The control unit 110 controls the general operation of the mobile communication terminal, and may include the modem 120 and the codec. The control unit 110 controls transmission of a message to a receiving mobile communication terminal by combining the common content and the specific content of the message. Common content refers to a portion of the message that is to be commonly transmitted to a plurality of mobile communication terminals, and specific content refers to a portion of the message that is to be transmitted only to a specific mobile communication terminal.

Figure 2A:
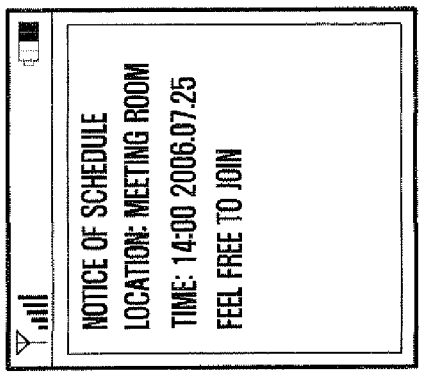
FIG. 2A, FIG. 2B, and FIG. 2C show screen display examples of messages received by a mobile communication terminal according to an exemplary embodiment of the present invention.
Figure 2B:
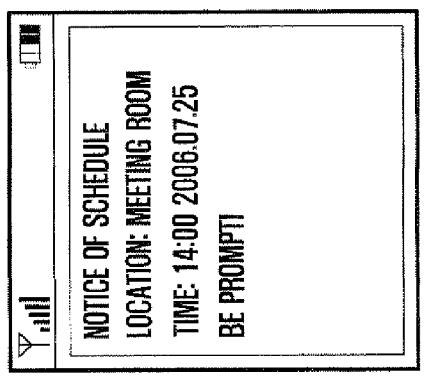
Figure 2C:
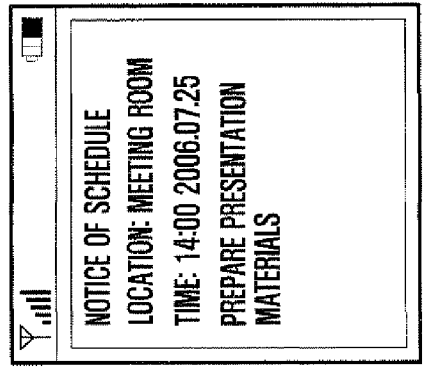

FIG. 2A, FIG. 2B, and FIG. 2C show screen display examples of messages received by a mobile communication terminal according to an exemplary embodiment of the present invention. FIG. 2A shows the contents of a message transmitted from a transmitting mobile communication terminal to a first receiving mobile communication terminal. FIG. 2B shows the contents of a message transmitted from the transmitting mobile communication terminal to a second receiving mobile communication terminal. FIG. 2C shows the contents of a message transmitted from the transmitting mobile communication terminal to a third receiving mobile communication terminal.

Referring to FIG. 2A, FIG. 2B, and FIG. 2C, the first, second, and third mobile communication terminals all receive common content of "NOTICE OF SCHEDULE, LOCATION: MEETING ROOM, TIME: 14:00 2006.07.25". However, the message content "PREPARE PRESENTATION MATERIALS" is transmitted only to the first mobile communication terminal, the message content "BE PROMPT!" is transmitted only to the second mobile communication terminal, and the message content "FEEL FREE TO JOIN" is transmitted only to the third mobile communication terminal. These portions of the messages, which are each transmitted only to a specific mobile communication terminal, are examples of specific content.

The camera (camera module) 140 captures an image and includes a camera sensor to convert a photo signal to an electric signal and a signal processing unit to convert an analog image signal taken by the camera sensor to digital data. A charge-coupled device (CCD) sensor may be used as the camera sensor and a digital signal processor (DSP) may be used as the signal processing unit. The camera sensor and the signal processing unit may be configured as an assembly or may be configured separately.

The image processing unit 150 generates screen data to display an image signal output by the camera 140. The image processing unit 150 processes the image signal output by the camera 140 in a frame unit, and outputs frame image data corresponding to the characteristics and size of the display unit 160. Additionally, the image processing unit 150 includes an image codec and compresses the frame image data to be displayed on the display unit 160 by a predetermined method or decompresses the compressed frame image data back to the initial frame image data. The image codec may be a JPEG codec, an MPEG4 codec, or a Wavelet codec. If the image processing unit 150 is configured with an on screen display (OSD) function, OSD data may be output by the control unit 110.

The display unit 160 displays an image signal output by the image processing unit 150 and user data output by the control unit 110. A liquid crystal display (LCD) may be used as the display unit 160. In this case, the display unit 160 may include an LCD controller, a memory unit for storing image data, and an LCD device. If the LCD device is configured with a touch screen system, the display unit 160 may also operate as an input device.

The key input unit 127 may include keys for inputting alphanumeric data and function keys for setting various functions. This may be other input devices, including without limitation, voice recognition or hand writing recognition mechanisms.

Figure 3:
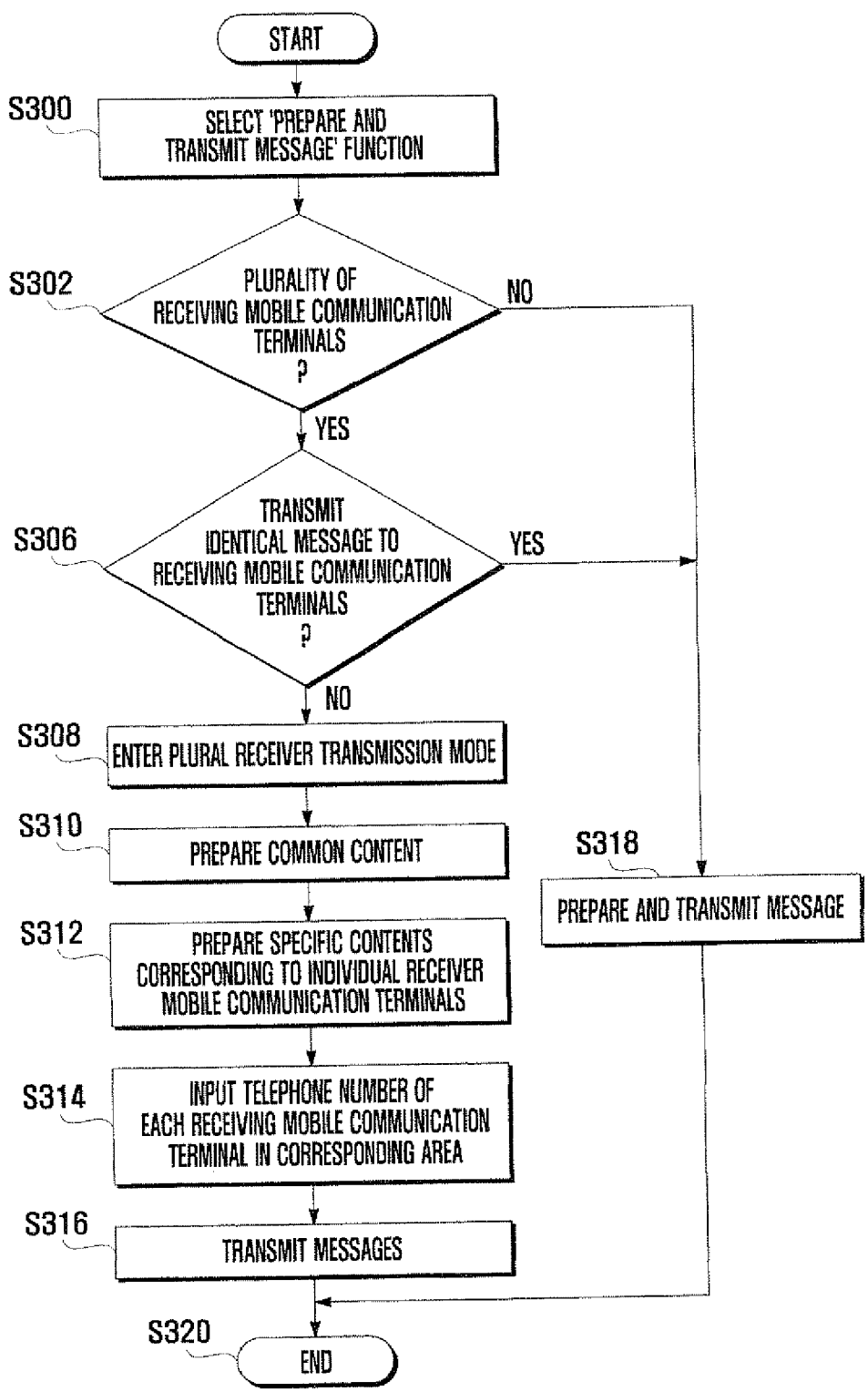
FIG. 3 is a flow chart showing a method of transmitting a message in a mobile communication terminal according to an exemplary embodiment of the present invention.

FIG. 3 is a flow chart showing a method of transmitting a message in a mobile communication terminal according to an exemplary embodiment of the present invention.

Referring to FIG. 3, a transmitting mobile communication terminal identifies that a function of preparing and transmitting a message is selected (S300).

The transmitting mobile communication terminal determines whether the message is to be transmitted to a plurality of receiving mobile communication terminals (S302). If the message is not to be transmitted to a plurality of receiving mobile communication terminals, a message is prepared at the transmitting mobile communication terminal in a conventional method and then transmitted to the receiving mobile communication terminal (S318).

If the message is to be transmitted to a plurality of receiving mobile communication terminals, the transmitting mobile communication terminal determines whether the messages to be transmitted to the plurality of receiver mobile communication terminals have identical contents. If the messages have identical contents, the messages are prepared and transmitted (S318).

On the other hand, if the messages to be transmitted to a plurality of receiver mobile communication terminals do not have identical contents at step S306, the transmitting mobile communication terminal enters a 'plural receiver transmission mode' (S308). In the exemplary embodiment of the present invention, the plural receiver transmission mode does not simply mean a message transmission mode for a plurality of receiving mobile communication terminals, but rather, means a message transmission mode in which messages to be transmitted to the receiving mobile communication terminals are not identical.

Figure 4C:
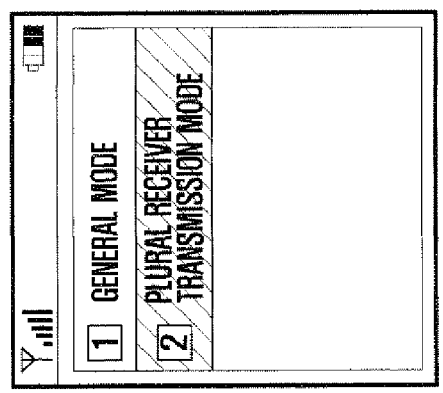
Figure 4B:
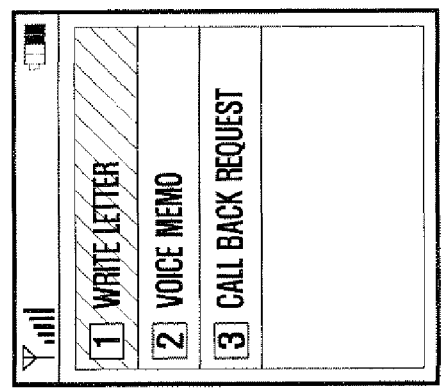
Figure 4A:
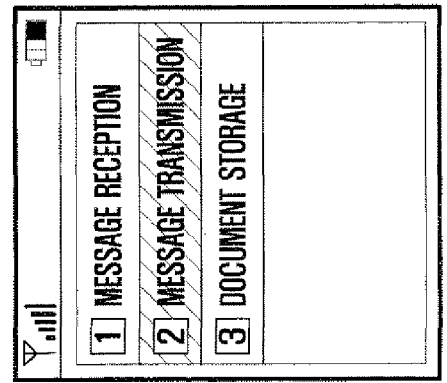

FIG. 4A, FIG. 4B, FIG. 4C, FIG. 4D, FIG. 4E, FIG. 4F, and FIG. 4G show screen display examples of data displayed on the display unit of a transmitting mobile communication terminal according to an exemplary embodiment of the present invention. FIG. 4A, FIG. 4B, FIG. 4C, FIG. 4D, FIG. 4E, FIG. 4F, and FIG. 4G show a process in which the transmitting mobile communication terminal enters the plural receiver transmission mode. Firstly, the transmitting mobile communication terminal enters a message mode, as shown in FIG. 4A, using the key input unit 127. The message mode includes menu options such as 'MESSAGE RECEPTION', 'MESSAGE TRANSMISSION', and 'DOCUMENT STORAGE'. If the menu option 'MESSAGE TRANSMISSION' is selected in FIG. 4A, the display unit 160 displays a sub-menu shown in FIG. 4B. The sub-menu of the menu option 'MESSAGE TRANSMISSION' includes 'WRITE LETTER', 'VOICE MEMO', and 'CALL BACK REQUEST'. If the sub-menu option 'WRITE LETTER' is selected in FIG. 4B, the transmitting mobile communication terminal displays a sub-menu shown in FIG. 4C. The sub-menu 'WRITE LETTER' includes sub-menu options 'GENERAL MODE' and 'PLURAL RECEIVER TRANSMISSION MODE', and may include other modes as sub-menu options. As described above, if the transmitting mobile communication terminal enters the plural receiver transmission mode due to selection of the corresponding sub-menu option, the display unit 160 displays a message input window, as shown in FIG. 4D.

Referring to FIG. 4D, the message input window includes a common content writing area and a specific content writing area. The specific content writing area may include multiple sub-writing areas. For example, 3 sub-writing areas are shown in the screen display examples of FIG. 4D, FIG. 4E, and FIG. 4F. However, the message input window may initially display only one sub-writing area of the specific content writing area. That is, the specific content writing area may be displayed only with the first sub-writing area. When preparation of the message in the first sub-writing area of the specific content writing area is complete, the second sub-writing area of the specific content writing area may be displayed using a specific key of the key input unit 127. By performing the above steps sequentially, the transmitting mobile communication terminal may generate as many sub-writing areas of the specific content writing area as required.

Although FIG. 4D shows the common content writing area and the specific content writing area simultaneously displayed on the display unit 160, the common content writing area and the specific content writing area may be displayed separately according to a user setting.

Referring to FIG. 3, after entering the plural receiver transmission mode at step S308, a user of the transmitting mobile communication terminal may prepare a message in the common content writing area (S310). Referring to FIG. 2A, FIG. 2B, and FIG. 2C, the common content of the message includes "NOTICE OF SCHEDULE, LOCATION: MEETING ROOM, TIME: 14:00 2006.07.25". FIG. 4E shows the common content of a message prepared at the transmitting mobile communication terminal.

After completing preparation of the common content of the message, the specific contents of the messages to be transmitted to individual receiving mobile communication terminals are prepared at the transmitting mobile communication terminal (S312). After completing preparation of the common content, the user may switch to the specific content writing area using a specific key of the key input unit 127.

FIG. 4F shows a message prepared in the specific content writing area. The first sub-writing area contains "PREPARE PRESENTATION MATERIALS", the second sub-writing area contains "BE PROMPT!", and the third sub-writing area contains "FEEL FREE TO JOIN".

After completing preparation of the specific content at step S312, a telephone number of each individual receiving mobile communication terminal is input at the transmitting mobile communication terminal in a telephone number input area corresponding to each sub-writing area (S314). That is, if preparation of a message including common content and specific content is complete, the transmitting mobile communication terminal enters a telephone number input mode.

Referring to FIG. 4G, the telephone number or identification code of the first receiving mobile communication terminal, to which the message prepared in the common content writing area and the first sub-writing area is to be transmitted, is entered in a first telephone number input area. The telephone number or identification code of the second receiving mobile communication terminal, to which the message prepared in the common content writing area and the second sub-writing area is to be transmitted, is entered in a second telephone number input area. The telephone number of the third receiving mobile communication terminal, to which the message prepared in the common content writing area and the third sub-writing area is to be transmitted, is input in a third telephone number input area.

After entering the telephone numbers or identification codes in step S314, the transmitting mobile communication terminal transmits the prepared messages (S316).

By performing the above steps, the first receiving mobile communication terminal receives the message shown in FIG. 2A, the second receiving mobile communication terminal receives the message shown in FIG. 2B, and the third receiving mobile communication terminal receives the message shown in FIG. 2C.

In FIG. 3, the method of preparing messages in the common content writing area and in the specific content writing area has been described. However, the present invention is not limited thereto. For example, the message may be prepared only in the specific writing area and transmitted in the same method as above. That is, at step S310 of FIG. 3, no message may be prepared in the common content writing area, and message preparation in the specific content writing area may follow directly at step S312.

In this case, each receiving mobile communication terminal receives only a message prepared in the specific content writing area. That is, the first receiving mobile communication terminal receives message content "PREPARE PRE- SENTATION MATERIALS", the second receiving mobile communication terminal receives message content "BE PROMPT!", and the third receiving mobile communication terminal receives message content "FEEL FREE TO JOIN".

Although the exemplary embodiment of the present invention discloses a method in which the telephone number of each receiving mobile communication terminal is entered after preparing messages in the common content writing area and in the specific content writing area, preparation of specific content of messages and input of the corresponding telephone number may also be performed sequentially. That is, the key input unit 127 of the transmitting mobile communication terminal may input the telephone number or other identification code of the first receiving mobile communication terminal after preparing a message in the first sub-writing area of the specific content writing area, and the key input unit 127 of the transmitting mobile communication terminal may input the telephone number of the second receiving mobile communication terminal after preparing a message in the second sub-writing area of the specific content writing area. Subsequently, the key input unit 127 of the transmitting mobile communication terminal may input the telephone number of the third receiving mobile communication terminal after preparing a message in the third sub-writing area of the specific content writing area. Of course, the telephone numbers can be retrieved from the phone book or other database of the transmitting mobile communication terminal or from other devices, such as a computer connected to the terminal.

As described above, the present invention may enable transmission of messages to a plurality of receiving mobile communication terminals with minimum key strokes by preparing messages containing both common content to be transmitted to all receiving mobile communication terminals and specific content to be transmitted to a specific receiving mobile communication terminal. Further, when transmitting the messages to a plurality of receiving mobile communication terminals, the likelihood of transmitting a message to an incorrect mobile communication terminal may be reduced by preparing messages and entering corresponding telephone numbers sequentially.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting messages from a transmitting mobile communication terminal to a plurality of receiving mobile communication terminals, the method comprising:
receiving a common content commonly transmitted to all receiving mobile communication terminals;
receiving a plurality of specific contents transmitted to specific receiving mobile communication terminals only;
receiving a plurality of identification codes, each identification code corresponding to a receiving mobile communication terminal to receive each of the plurality of specific contents;
combining each of the plurality of specific contents with the common content to create a plurality of combined messages; and
transmitting each of the plurality of combined messages to each of the specific receiving mobile communication terminals,
wherein each of the plurality of combined messages is composed of the common content and at least one of the plurality of specific contents,
wherein the common content is separate from the specific content, and
wherein the common content is received in a common content input area of a display of the transmitting mobile communication terminal, and the plurality of specific contents are received in a specific content input area of the display.

2. The method of claim 1, wherein the plurality of identification codes are received in an identification code input area of the display.

3. The method of claim 1, wherein a first specific content and a first identification code corresponding to the first specific content are both received prior to either of a second specific content and a second identification code corresponding to the second specific content.

4. An apparatus for transmitting a message, the apparatus comprising:
an input device to receive a common content commonly transmitted to all receiving mobile communication terminals, to receive a plurality of specific contents transmitted to specific receiving mobile communication terminals only, and to receive a plurality of identification codes, each identification code corresponding to a receiving mobile communication terminal to receive the specific contents; and
a control unit to combine each of the plurality of specific contents with the common content to create a plurality of combined messages and to transmit each of the plurality of combined messages to each of the specific receiving mobile communication terminals,
wherein each of the plurality of combined messages is composed of the common content and at least one of the plurality of specific contents,
wherein the common content is separate from the specific content, and
wherein the input device is configured to receive the common content in a common content input area of a display of the apparatus, to receive the plurality of specific contents in a specific content input area of the display, and to receive the plurality of identification codes in an identification code input area of the display.

5. The apparatus of claim 4, wherein:
the specific content input area comprises a plurality of specific content input sub-areas;
the identification code input area comprises a plurality of identification code input sub-areas; and
each identification code input sub-area corresponds to one of the plurality of specific content input sub-areas.

6. The method of claim 2, wherein:
the specific content input area comprises a plurality of specific content input sub-areas;
the identification code input area comprises a plurality of identification code input sub-areas; and
each identification code input sub-area corresponds to one of the plurality of specific content input sub-areas.

* * * * *